United States Patent Office 2,728,758
Patented Dec. 27, 1955

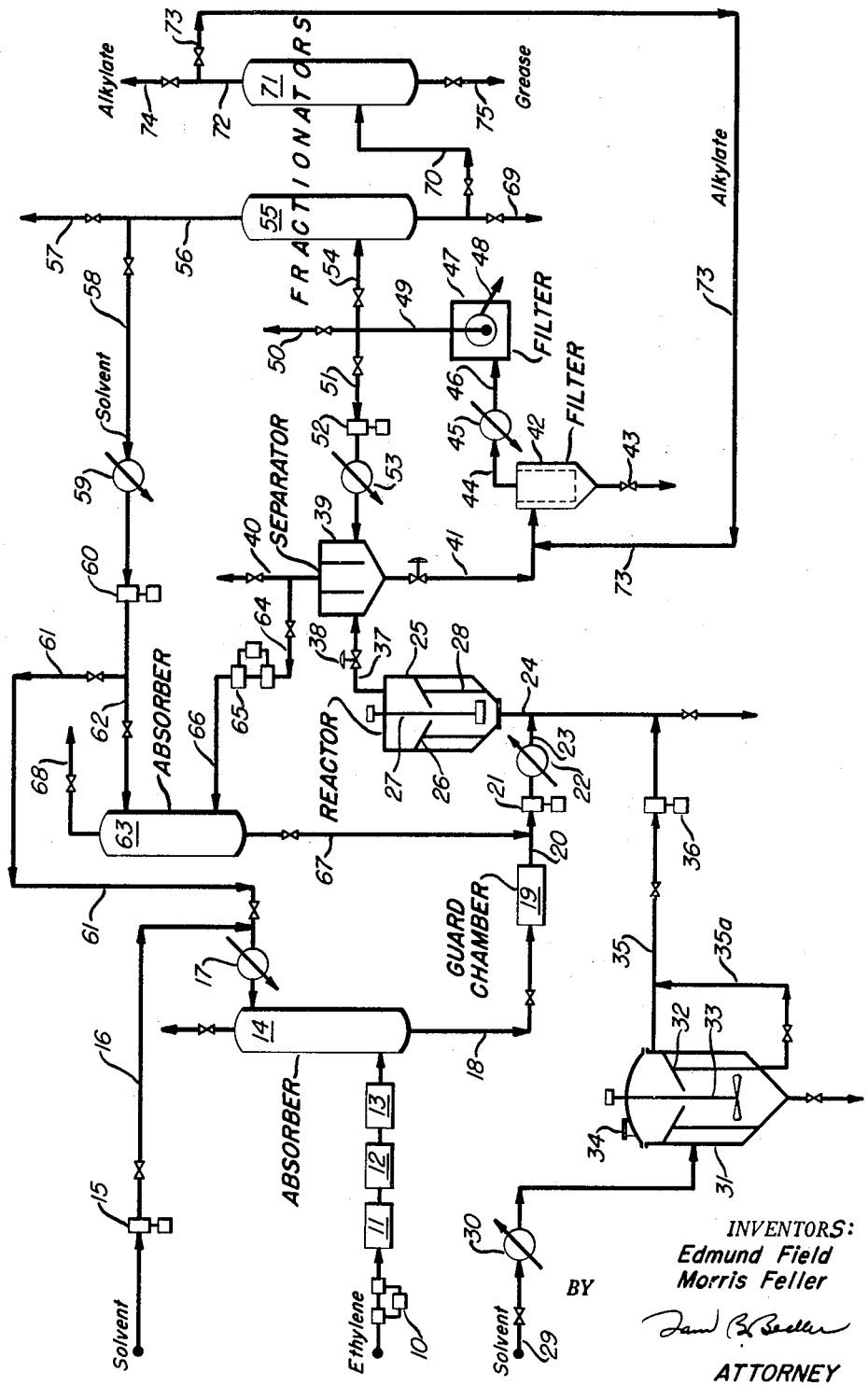

2,728,758

OLEFIN CONVERSION WITH GROUP 6a METAL OXIDES AND REACTIVE METAL BOROHYDRIDES

Edmund Field, Chicago, and Morris Feller, Park Forest, Ill., assignors to Standard Oil Company, Chicago, Ill., a corporation of Indiana Application February 18, 1954, Serial No. 411,246

21 Claims. (Cl. 260—94.9)

This invention relates to a novel polymerization process. In a more specific aspect, this invention relates to a novel process for the polymerization of ethylene, propylene or their mixtures in the presence of certain metal borohydrides and a solid catalytic material containing an oxide of a metal of Group 6a (left hand subgroup of Group 6) of the Mendeleef Periodic Table, viz. one or more of the oxides of Cr, Mo, W or U (note, e. g., J. R. Partington, "A Textbook of Inorganic Chemistry," MacMillan and Co., Ltd., London, page 411 (1937)).

One object of our invention is to provide novel and highly useful catalysts and catalyst promoters for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent oxides of group 6a metals. Another object is to provide a novel process for the polymerization of ethylene or propylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin such as propylene, to provide novel resinous materials.

Yet another object of our invention is to provide extremely active promoters for the action of solid catalysts comprising an oxide of group 6a of the periodic table for the polymerization of ethylene and/or propylene or other comonomers to tough, resinous solid products. These and other objects of our invention will become apparent from the ensuing description thereof.

Briefly, the inventive process comprises the conversion of ethylene principally to high molecular weight normally solid polymers by contact with one or more of the oxides of chromium, molybdenum, tungsten or uranium, for example, a partially reduced molybdenum trioxide extended upon a support, and a metal borohydride which reacts with water at polymerization temperatures to yield hydrogen. The inventive process is effected at polymerization temperatures between about 75° C. and about 325° C., preferably between about 130° C. and 260° C., and pressures between about atmospheric and 15,000 p. s. i. g. or higher, preferably between about 200 and 5000 or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for ethylene polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., iso-octane, are preferred.

However, the conversion of ethylene- or propylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$ relative $-1$)$\times 10^5$]. By the term "tough, resinous polyethylene" as used herein, we mean polymer having a brittle point below $-50°$ C. (A. S. T. M. Method D746–51T), impact strength greater than two foot pounds per inch of notch (A. S. T. M. Method D256–47T—Izod machine) and minimum elongation at room temperature (25° C.) of 100%.

The process of the present invention can be employed to effect the copolymerization of ethylene with other polymerizable materials such as mono-olefinic hydrocarbons, e. g., propylene, n-butylenes, iso-butylene, t-butylethylene, and the like, usually in proportions between about 1 and about 25% by weight, based on the weight of ethylene.

The reactive metal borohydrides which are employed in the present process are all characterized by the fact that they react vigorously with water under the polymerization conditions to yield hydrogen. The reaction of some of the metal borohydrides with water is sometimes rapid or substantially instantaneous. It appears that with the very reactive metal borohydrides, the rate of reaction with water is limited principally by the rate of contacting. While sodium borohydride decomposes only slowly and slightly in cold water, its rate of reaction therewith to form hydrogen increases with increasing temperature of the solution. The borohydrides which we may employ, for example, are those of the alkali metals, especially sodium, lithium and potassium. Magnesium, beryllium, aluminum, thorium, hafnium, zirconium and uranium borohydrides may also be employed. These reactive borohydrides are all characterized, also, by their ability to reduce polyvalent metal salts, for example, by their ability to reduce Ti in TiCl$_4$ to the +3 valence state.

The employment of a reactive metal borohydride in the reaction zone has numerous important practical consequences, as compared to processes wherein said metal oxide catalysts are employed alone. Thus, in the presence of both the reactive metal borohydride and the metal oxide catalyst, high yields of solid polymers can be obtained, the metal oxide catalyst can function well in the presence of large proportions of liquid reaction medium, the metal oxide catalyst retains strong polymerization activity for a long period of time (long catalyst life), polymers having desirable ranges of physical and chemical properties can be readily produced by controlling the reaction variables, etc., as will appear from the detailed description and operating examples which follow.

The function or functions of the reactive metal borohydride in our process are not understood. The reactive metal borohydrides promote the action of the group 6a metal oxide catalysts to increase the productivity (polymer yield) of said catalysts, sometimes prodigiously. It might be assumed that said borohydrides function merely to react with catalyst poisons which might be present in small proportions of the order of a few parts per million in ethylene, propylene and/or in the liquid reaction medium; we have found, however, that in the absence of a promoter even the use of extremely pure ethylene and liquid reaction medium does not produce solid polymer in the high yields or quality which can be attained by the process of the present invention.

Prior to our invention, subhexavalent molybdenum oxides were known to be catalysts for the polymerization of ethylene to form normally-solid polymers only when supported upon the three difficultly reducible metal oxides: gamma-alumina, titania, zirconia. In the presence of reactive metal borohydrides, the group 6a metal oxide catalysts can be extended not only upon an activated alumina, titania or zirconia supports but also on a great variety of other supports for the polymerization of ethylene-containing charging stocks to form normally solid polymers, e. g., silica supports such as silica gel, kieselguhr, diatomite; silica-alumina, aluminosilicates, such as various clays and bleaching earths; and even adsorptive carbon, which is however not preferred. In a practical process, it is preferable to furnish a difficultly reducible metal oxide for the group 6a metal oxide catalyst, e. g. gamma-alumina or other activated alumina.

The proportion of reactive metal borohydride employed may be varied between about 0.005 to about 2 parts by weight of the metal oxide catalyst (total weight of solid catalyst). The optimum proportions can readily be determined in specific instances, by simple small-scale tests with the specific feed stocks, liquid reaction medium, reaction medium:catalyst ratio, catalyst, specific metal borohydride, temperature, pressure and nature of the product which is desired. Usually $LiBH_4$ is employed in proportions between about 0.05 and about 2 parts by weight per part by weight of molybdena catalyst at ratios between about 5 and about 2000 volumes of liquid medium per part by weight of metal oxide catalyst. Sodium borohydride is usually employed in the proportion of at least about 0.5 part by weight per part by weight of the group 6a metal oxide catalyst.

The relative proportions of support to the catalytic metal oxide is not critical and may be varied throughout a relatively wide range such that each component is present in amounts of at least approximately 1 weight percent. The usual metal oxide-support ratios are in the range of about 1:20 to 1:1, or approximately 1:10. We employ conditioned alumina-metal oxide catalysts composed of gamma-alumina base containing about 1 to 80%, preferably about 5 to 35%, or approximately 10%, of catalytic metal oxide supported thereon.

Activated alumina, titania and zirconia supports for our catalysts may be prepared in any known manner and the oxides of molybdenum or other group 6a metal may likewise be incorporated in, or deposited on, the support in any known manner, e. g. as described in copending Serial No. 223,641, (now U. S. Patent 2,692,257) of Alex Zletz and Serial No. 223,643 (now U. S. Patent 2,692,258) of Alan K. Roebuck and Alex Zletz, both filed on April 28, 1951.

Molybdena or other molybdenum-oxygen compounds, such as cobalt molybdate, may be incorporated in the catalyst base in any known manner, e. g. by impregnation, coprecipitation, co-gelling, and/or absorption, and the catalyst base and/or finished catalyst may be heat-stabilized in the known manners heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, chromous, tungstic and uranic acids may also be employed, with or without a support.

The catalyst may be stabilized with silica (U. S. 2,437,532–3) or with aluminum ortho-phosphate (U. S. 2,440,236 and 2,441,297) or other known stabilizers as modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, vanadium, thorium, iron, etc., may be present in minor amounts, below 10 weight percent of the total catalyst.

Although, as stated above, no reducing treatment need be effected on the metal oxide catalysts when they are employed in the presence of a reactive metal borohydride, a reducing or conditioning treatment is preferred in commercial processing. The conditioning or reducing treatment of the hexavalent group 6a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operation may be effected with hydrogen at about atmospheric pressure. The partial reduction of the metal oxide catalyst in which the metal is present in its hexavalent state can be effected in the presence of the reactive metal borohydride promoter, prior to contacting the combination of catalysts with ethylene.

We have at times observed that an induction period before ethylene polymerization can be eliminated or substantially reduced by pressuring hydrogen into the reactor containing the solvent, ethylene, metal oxide catalyst and borohydride, e. g. at hydrogen pressures between about 10 and about 900 p. s. i. g., preferably 100–400 p. s. i. g.; under these conditions a small proportion of the ethylene is reduced to ethane.

Lithium aluminum hydride an exceptionally active reducing agent, conditions and activates catalysts containing hexavalent group 6a metal oxides even at temperatures as low as 35° C., although in general temperatures between about 100 and about 300° C. are employed. In practice, for example, a catalyst containing free or chemically combined $MoO_3$ (e. g., combined as in $CoMoO_4$) is treated with a suspension of $LiAlH_4$ in a hydrocarbon solvent at weight ratios of about 0.01 to about $1LiAlH_4$ per weight of solid catalyst. Sodium hydride (or sodium plus $H_2$) is effective in reducing and conditioning hexavalent group 6a metal oxide catalysts such as $MoO_3$ at temperatures above about 180° C. and can be employed in the same proportions as $LiAlH_4$. The reactive metal borohydrides of the present invention may likewise be employed to effect partial prereduction of the group 6a metal oxide catalysts, employing essentially the same conditions as when $LiAlH_4$ is used.

The conditioning and reducing treatment of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground, freshly-reduced catalyst into a glass-stoppered 250-ml. Erlenmeyer flask and adding 25 ml, of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-ortho-phenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the oxidation state of molybdenum can be determined.

The partial reduction of the molybdena or other group 6a metal trioxide is carried out to the extent that the average valence state of the catalytic metal in the catalyst lies within the range of about 5.5 to about 2.0, preferably between about 3 and about 5.

The conditioning treatment hereinabove described is useful not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered suffiicently active by simple removal of polymer and conditioning with a reducing gas as hereinabove described, it may be regenerated by extraction with water or dilute aqueous acids, thereafter burning combustible deposits therefrom with oxygen followed by the conditioning step. Detoxification of the catalyst by treatment with dilute aqueous solutions of per-acids such as permolybdic, pervanadic or pertungstic acids may be practiced, followed by hydrogen-conditioning of the catalysts.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range. Pellets or granules containing both the metal oxide catalyst and solid metal borohydride may be prepared and used in our process.

The charging stock to the present polymerization process preferably comprises essentially ethylene. The ethylene charging stocks may contain hydrogen and hydrocarbons, as in refinery gas streams, for example, methane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 75° C. and about 325° C. Usually polymerization is effected in the present process at temperatures between about 110° C. and about 275° C. or the preferred narrower range of about 220 to about 260° C. The conjoint use of polymerization temperatures between about 220 and about 260° C. and a liquid hydrocarbon reaction medium such as benzene, xylenes, decalin or methyl decalins is highly desirable in producing ethylene polymers having specific viscosities ($\times 10^5$) ranging on the average from about 10,000 to about 30,000 in continuous operations with relatively long on-stream periods and clean catalysts.

It has been found that the present process can be employed for the production of relatively high molecular weight ethylene hetero- and homo-polymers at relatively low pressures. The process of the present invention can be effected to some extent even at atmospheric pressure. The upper liimt of the partial pressure of ethylene in the process is dictated by economic considerations and equipment limitations and may be 10,000 p. s. i. g., 20,000 p. s. i. g., or even more. A generally useful and economically desirable ethylene pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about 0.1 and about 10 volumes, preferably about 0.5 to 5 or about 2 volumes of ethylene solution in a liquid reaction medium, which is usually an aromatic hydrocarbon such as benzene, xylenes or tetralin, or a cycloaliphatic hydrocarbon, such as decalin (decahydronaphthalene). The amount of ethylene in such solutions may be in the range of about 2 to 50% by weight, preferably about 2 to about 10 weight percent or, for example, about 5 to 10 weight percent.

We have observed that when the ethylene concentration in the liquid reaction medium described is below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers should not be such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments may occur, resulting in the catalyst carry-over as fines with the solution of polymerization products and extensive loss of catalyst from the reactor.

In batch operations, operating periods of between about one-half and about 10 hours, usually between about 1 and about 4 hours, are employed and the reaction autoclave is charged with ethylene as the pressure falls as a result of the ethylene conversion reaction.

The solvent:catalyst weight ratio can be varied in the range of about 5 to about 2000, or even higher for flow systems, preferably between about 50 to about 1000. The employment of high solvent:catalyst ratios, which is rendered possible by the presence of a reactive metal borohydride in the reaction zone, is very important in obtaining high yields of polymer.

Ethylene, propylene or their mixtures can be polymerized in the gas phase and in the absence of a liquid reaction medium by contact with reactive metal borohydride and a group 6a metal oxide catalyst. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of ethylene in the presence of suitable liquid reaction media. The liquid reaction medium may also be employed as a means of contacting the olefin with catalyst by preparing a solution of olefin in the liquid reaction medium and contacting the resultant solution with the polymerization catalyst. The liquid reaction medium functions as a solvent to remove some of the normally solid product from the catalyst surface.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec.-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations and distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-hexane, n-pentane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyl decalins, dimethyldecalins and the like.

We may also employ a liquid hydrocarbon reaction medium comprising liquid olefins, e. g., n-hexenes, cyclohexene, 1-octene, hexadecenes and the like.

The normally solid polymerization products which are retained on the catalyst surface or grease-like polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, phosphoric acid or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of suitable treatments.

We have purified C. P. xylenes by refluxing with a mixture of $MoO_3$-$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

The liquid hydrocarbon reaction medium is present in the reaction zone as a distinct liquid phase. Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances, the solvent may be present as a dense gas phase.

When solvents such as xylenes are employed, some alkylation thereof by ethylene can occur under the reaction conditions. Propylene is a far more reactive alkylating agent than ethylene and when propylene is present in the feed it is desirable to employ a non-alkylatable solvent such as decalin. The alkylate is removed with grease in the present process, can be separated therefrom by fractional distillation and can, if desired, be returned to the polymerization zone.

An illustrative flow diagram indicating one method by which the process of our invention may be effected is set forth in the accompanying figure. The olefinic charging stock, ethylene or an ethylene-propylene mixture, is passed through compressor 10 wherein the pressure thereof is raised to a suitable value, for example, between about 500 and 2000 pounds, thence into chamber 11, which is provided with a suitable deoxygenating agent such as metallic copper at 150° C., then into chamber 12 which is provided with a dehydrating reagent such as adsorptive alumina, anhydrous calcium sulfate, silica gel or equivalent drying reagents. The dried charging stock is passed from chamber 12 into chamber 13 wherein carbon dioxide is removed from the charging stock. Chamber 13 is provided with a suitable reagent, for example, sodium hydroxide deposited upon asbestos or with any other efficacious decarbonating reagent. The charging stock may be dried further if necessary after leaving chamber 13. The charging stock thus purified usually contains less than 50 parts per million of oxygen and has a dew point below −45° C. The purified charging stock is passed into an absorber 14, wherein it meets a counterflow of solvent. Solvent or liquid reaction medium may be charged to the absorber and to the process by pump 15 through valved line 16 and heat exchanger 17, wherein it is brought to a suitable temperature for absorption, usually between about 15 and about 35° C. although higher or lower temperatures can be used; recycle solvent from line 61 may also be charged to the absorber or may be the sole absorption medium employed. In absorber 14 a solution containing between 2 and about 30 percent olefin, e. g. about 7 weight percent ethylene, is produced and is withdrawn through valved line 18 into a guard chamber 19 for final purification. The guard chamber may contain an active metal or metal hydride, for example, sodium or other alkali metal, an alkaline earth metal, an alkali metal hydride or an alkaline earth metal hydride. A preferred material for use in the guard chamber is calcium hydride. The guard chamber may be operated at temperatures between about 100° C. and about 280° C. If the feed stock is of sufficient purity, the guard chamber may be by-passed (by lines not shown) and the feed introduced directly into reactor 25.

From guard chamber 19 the ethylene and solvent are discharged into line 20, thence through pump 21 into heater 22 wherein they are brought to the polymerization temperature, for example, between about 200 and about 275° C. From heater 22 the charge is passed through line 23, thence through line 24 into the lower end of reaction chamber 25. While a variety of suitable reactors can be employed, in the accompanying figure there is illustrated an autoclave divided into upper and lower sections by baffle 26. A stirring mechanism 27 projects into the lower portion of the reactor and suitable baffles 28 are provided at the walls. The stirring mechanism may be operated at about 20 to about 1000 R. P. M., e. g., about 650 R. P. M. It will be apparent, therefore, that a high degree of intermixing between the catalyst, reactive metal borohydride, olefinic material and liquid reaction medium is achieved in the lower portion of reactor 25. Reactor 25 may be initially charged with the group 6a metal oxide catalyst and reactive metal borohydride, e. g., LiBH₄, through lock hopper devices or other means, bearing in mind the chemical and physical properties of the specific metal borohydride which is to be used. Further amounts of metal oxide catalyst and borohydride can be added intermittently during the course of the reaction, as desired, by suitable means.

If desired, a portion of predried solvent can be passed through valved line 29 and heater 30, wherein it is brought to a temperature between about 150 and about 300° C., into a contacting chamber 31 provided with baffle 32, stirring mechanism 33 and an inlet 34 for alkali metal. An intimate dispersion or solution of alkali metal in solvent is formed in contactor 31 and is withdrawn from the upper, relatively quiescent zone of contactor 31 through valved line 35 into line 24 and is forced by pump 36 into reactor 25. An alternative and very useful method of purifying the solvent in contacting chamber 31 is to treat said solvent with an alkali metal hydride, usually NaH and a supported group 6a metal oxide, e. g. 10 weight percent NaO₃-gamma alumina, using about 3 to about 10 parts by weight of supported metal oxide per part by weight of alkali metal hydride, at a temperature between about 135 and about 270° C. and liquid hourly space velocities between about ½ and about 10.

In reactor 25, the polymerization of ethylene or copolymerization of ethylene with other monomeric materials such as propylene, is effected at suitable temperatures and pressures. The usual concentration of ethylene in the solvent entering the reactor is about 10 weight percent and the effluent from the reactor is usually a 2–5 weight percent solution of solid polymer in the solvent. When the preparation of a homopolymer of ethylene having a melt viscosity in the range of about $2 \times 10^5$ to about $5 \times 10^6$ poises is desired, the preferred temperatures are between about 230° C. and about 275° C. The reaction period can be varied between about 10 and about 100 minutes.

It will be understood that instead of one reactor we may employ a number of reactors in parallel or in series. When reactors are employed in series, variations in temperature and pressure, olefin concentration in solvent, and catalyst concentration become possible so that more control can be exerted over the average molecular weight and molecular weight range of the product, as well as of the extent of conversion in each stage. Also, through the employment of a number of manifolded reactors, suitable by-pass lines and valves, it becomes possible to cut any reactor out of the system for purposes of cleaning and repair.

The upper portion of reactor 25 constitutes a quiescent settling zone wherein fine catalyst particles and residual borohydride settle from the solution of polymer product in the reaction solvent and return under the force of gravity to the lower agitated portion of the reactor. The relatively clear solution of reaction products in solvent is withdrawn from the upper portion of reactor 25 through line 37 and expansion valve 38, wherein the pressure is allowed to fall to a value between about 15 and about 250 p. s. i. g. The product mixture discharges from valve 38 tangentially into a separator, e. g., cyclone-type separator 39, wherein a temperature of at least about 150° C. is maintained. Gas comprising a substantial proportion of ethylene in a poison-free condition is discharged from separator 39 through valved line 40. Hot solvent may be introduced into separator 39 through line 51 in order to prevent separation of polymer upon the walls of the separator.

In one preferred mode of operation, clear effluent from reactor 25 is bled through valve 38 down to the vapor pressure of the solvent, while maintaining the temperature in separator 39 at about 200° C. In this method of operation, essentially all the ethylene and a substantial proportion of the benzene are removed from the effluent of reactor 25 and can be recycled (by lines and a pump not shown) to said reactor. The relatively concentrated polymer solution can be treated as described hereinafter.

The solution of polymer in solvent is withdrawn from separator 39 through valved line 41, into filter 42, wherein any fine catalyst particles which may have been carried along, are separated and withdrawn through valved line 43. If desired, the polymer solution may be subjected to the action of ultrasonic vibrators, which effect coagulation of the very fine catalyst particles so that they can be more readily filtered.

The solution of polymer product is withdrawn from filter 42 through line 44 into cooler 45, wherein its temperature is adjusted to a value between about 90 and about 20° C. and is then discharged through line 46 into filter 47. The solid polymer product is removed from filter 47 at 48 and the solvent or reaction medium is withdrawn through line 49, whence a portion can be discharged from the system through valved line 50, a portion can be passed through valved line 51, pump 52 and heater 53 into separator 39, and the remainder can be passed through valved line 54 into fractionator 55.

Precipitation of polymer from the solution in line 44 can be induced by the addition of antisolvents such as low-boiling hydrocarbons, e. g. propane, alcohols, ketones (acetone), etc. The polymeric products of the present process removed at 48 can be subjected to various treatments to prepare it for conversion to a finished industrial product. Thus, it may be subjected to various treatments to remove imbibed solvent, it may be shredded or extruded to form string-like particles, dried, etc.

In fractionator 55, the solvent or liquid reaction medium is vaporized and passes overhead through line 56, whence a portion may be removed from the system through valved line 57, but is preferably passed through valved line 58 into cooler 59, wherein its temperature is brought to a value between about 20 and about 80° C., whence it is passed into pump 60. Pump 60 forces the solvent through valved line 61 and heat exchanger 17 into absorber 14 to prepare a solution of fresh ethylene charging stock for the polymerization process. A portion of the solvent is also forced by pump 60 through valved line 62 into the upper portion of absorber 63. Recycled gases from separator 39 and line 40 are passed through valved line 64 and compressor 65 through line 66 into the lower portion of absorber 63, in which ethylene is selectively absorbed in the solvent to produce a solution having a concentration between about 2 and about 10 weight percent of ethylene, which is discharged from absorber 63 through valved line 67 into line 20, whence it is passed to reactor 25. Unabsorbed gases are discharged from absorber 63 through valved line 68.

Liquid reaction products boiling above the boiling range of the solvent medium can be discharged from fractionator 55 and the process through valved line 69 but are preferably passed through valved line 70 into a second fractionator 71. A by-product produced in relatively small volume in the present polymerization process, when an alkylatable aromatic hydrocarbon solvent such as a xylene is employed, is an alkylate produced by reaction of said alkylatable aromatic hydrocarbon and ethylene (or propylene, when that is employed as a component of the charging stock). The alkylated aromatic hydrocarbon products are vaporized and fractionated in tower 71, from which they are discharged through line 72. It is usually desirable to recycle at least a portion of the alkylate through valved line 73 to line 41 for employment as a solvent in filter 42. The remainder of the alkylate may be discharged from the process through valved line 74 or may be recycled for employment as part of the liquid reaction medium in reactor 25.

Relatively small proportions of low molecular weight grease-like ethylene polymers are produced in the polymerization process. The grease-like products are removed as a bottoms fraction from tower 71 through valved line 75.

An alternative method of operation following filtration of fine catalyst particles in filter 42 involves introduction of the dilute solution of ethylene polymers in the reaction solvent, e. g., benzene, into a tower containing hot water or a mixture of liquid water and steam at a temperature sufficient to flash distil the solvent (or an azeotrope of solvent and water) from the solution and to produce a water slurry of the solid polymer containing about 1 to about 5 weight percent polymer. The aqueous slurry of polymer can be concentrated by conventional methods to yield a slurry containing about 10 to 15 weight percent polymer, which can thereafter be centrifuged to yield a polymer containing a minor proportion of water, and can then be thoroughly dried in conventional equipment. The solvent passing overhead in the flash distillation operation can be condensed, separated from a lower liquid layer of water, redistilled to further dry it and finally can be thoroughly dried with desiccants, e. g. silica gel or alumina gel, prior to recycle to storage or to the polymerization reaction zone.

Another alternative is to spray-dry the solution of polymer in aromatic solvent from which catalyst fines have been removed.

In considering the following examples, the important effects of our reactive metal borohydride promoters will be appreciated by bearing the following information in mind. In runs carried out without any promoters, employing 8 weight percent pre-reduced molybdena-gamma-alumina catalyst and a C. P. xylenes:catalyst ratio (ml./g.) of 5, 0.5 g. per g. of catalyst of solid ethylene polymer were obtained at 230° C. and 1000 p. s. i. g. initial ethylene pressure, ethylene being pressured into the reactor until no further quantities could be absorbed by the reaction mixture. No solid polymer could be produced when dehydrated and decarbonated ethylene was contacted at a partial pressure of 660 p. s. i. g. with 2.0 g. of a tungstia-zirconia catalyst (pre-reduced with hydrogen at 450° C. and atmospheric pressure) at 250° C. for 21 hours.

The following examples are included to illustrate but not necessarily to limit the claimed invention. The reactor employed in each instance was a pressure vessel having a capacity of 250 cc. provided with a magnetically-operated stirring mechanism. Air was excluded from the reactor during the charging process by maintaining a flow of nitrogen therethrough and residual air was flushed from the autoclave by a stream of hydrogen, before proceeding with the reaction. Ethylene is pressured into the reactor from time to time as it is consumed in reaction.

*Example 1*

The charge to the reactor is 1 g. of 8 weight percent molybdena supported on gamma-alumina, pre-reduced with hydrogen at 480° C. and employed in the form of a filter cake of 20–85 mesh/inch size; 0.2 g. of lithium borohydride and 100 cc. of purified xylenes solvent. The reactor contents are heated to 249° C. under a low hydrogen pressure and ethylene is then injected to a partial pressure of 825 p. s. i. g. while the reactor contents are agitated. Ethylene is injected into the reactor from time to time to maintain its initial partial pressure. Reaction is terminated after 345 minutes. The reaction yielded 9.13 g. of a polymer capable of being converted to a tough and flexible film, said polymer having a specific viscosity ($\eta$ relative $-1 \times 10^5$) of 24,600, melt viscosity of $1.4 \times 10^6$ poises and density at 24° C. of 0.963. Also produced were 0.40 g. of grease-like polymer and 1.0 g. of alkylated xylenes.

*Example 2*

The process of Example 1 is repeated, but with the substitution of magnesium borohydride for lithium borohydride to produce a solid ethylene polymer. The operating procedure and product workup are the same as in Example 1.

*Example 3*

The process of Example 1 is repeated, but with the substitution of aluminum borohydride for lithium borohydride to produce a solid ethylene polymer. The operating procedure and product workup are the same as in Example 1.

*Example 4*

The charge to the reactor is 2.0 g. of 20 weight percent tungstia deposited on zirconia of 30 mesh size (pre-reduced in hydrogen at 450° C. and atmospheric pressure); 0.5 g. of lithium borohydride and 100 cc. of isooctane. The contents of the reactor are heated to 250° C. with agitation under a slight hydrogen pressure and ethylene is then injected to a partial pressure of 710 p. s. i. g., which is maintained over a reaction period of 17 hours. The reaction yields 2.36 g. of solid polymer, 0.74 g. of grease-like polymer and 1.3 g. of alkylate.

*Example 5*

The reactor is charged with 2.0 g. of tungstia-zirconia catalyst as used in Example 4, 0.5 g. of lithium borohydride and 100 cc. of silica gel-treated decalin. The reactor contents are heated with agitation to 255° C. under a slight pressure of hydrogen and ethylene is thereafter injected to a partial pressure of 950 p. s. i. g. Reaction is continued for 20 hours, during which period ethylene is pressured into the reactor as needed to maintain the initial partial pressure value. The reaction yields 8.9 g. of solid ethylene polymer capable of forming a tough and flexible film, having a melt viscosity of $1.8 \times 10^5$ poises and density (24° C.) of 0.9608. An alkylate of decalin is also produced in the amount of 1.0 gram.

*Example 6*

The procedure of Example 5 is repeated except that the lithium borohydride is replaced by magnesium borohydride to produce a tough, flexible ethylene polymer.

*Example 7*

The procedure of Example 5 is repeated except that lithium borohydride is replaced by aluminum borohydride to produce a tough, flexible ethylene polymer.

*Example 8*

When the procedure of Example 1 was repeated, but the lithium borohydride was replaced by the same weight of sodium borohydride, at 247° C., ethylene partial pressure of 795 p. s. i. g. and a period of 12 hours, 1.46 g. of grease-like solids and 2.33 g. of xylenes alkylate were produced.

*Example 9*

The reactor is charged with 2 g. of 8 weight percent molybdena supported upon gamma-alumina, a filter cake of 30–80 mesh per inch, partially reduced with hydrogen at 480° C. and atmospheric pressure for about 16 hours. Also charged are 1 g. of sodium borohydride and 100 cc. of purified toluene. The reactor contents are heated with stirring to 252° C. and ethylene is then pressured into the reactor to an initial partial pressure of 655 p. s. i. Reaction is continued for 19.5 hours to yield 3.2 g. per g. of molybdena-alumina catalyst of a solid polymer having a density (24/4° C.) of 0.966, Williams plasticity of 22.9 and melt viscosity of $3 \times 10^4$ poises. The reaction also yields 0.55 g. per g. of catalyst of solid, grease-like polyethylenes.

Example 10

The reactor is charged with 1 g. of the molybdena catalyst prepared as in Example 9, 1 g. of sodium borohydride and 100 cc. of purified toluene. The reactor contents are heated with stirring to 252° C. and ethylene is then injected to an initial partial pressure of 690 p. s. i. Reaction is continued for 20 hours to yield 5.9 g. per g. of molybdena catalyst of a tough solid polymer having a density (24/4° C.) of 0.9606, Williams plasticity of 58.5 and melt viscosity of $9.1 \times 10^5$ poises. The reaction also yields 1.67 g. per g. of catalyst of solid, grease-like polyethylenes.

Example 11

The reactor is charged with 0.5 g. of molybdena-alumina catalyst prepared as in Example 9, 1 g. of sodium borohydride and 100 cc. of purified toluene. The contents of the reactor are heated with stirring to 252° C. and ethylene is then pressured into the reactor to an initial value of 680 p. s. i. Reaction is continued for 20 hours to yield 2.6 g. per g. of molybdena-alumina catalyst of tough solid ethylene polymer having a density (24/4° C.) of 0.958 and melt viscosity of $3.6 \times 10^6$ poises. The reaction also yields 2 g. per g. of catalyst of solid grease-like polyethylenes.

Example 12

The reactor is charged with 100 cc. of purified toluene, 1 g. of sodium borohydride and 1 g. of a commercial 31 weight percent chromia-activated alumina catalyst which is prereduced before use by contact with hydrogen at 400° C. and atmospheric pressure for about 16 hours. The reactor contents are heated to 234° C. and ethylene is then introduced to an initial partial pressure of 725 p. s. i. Reaction is continued for 20 hours to yield 70 weight percent, based on the chromia-alumina catalyst, of solid polyethylenes.

Example 13

The reactor is charged with 100 cc. of purified toluene, 1 g. of sodium borohydride and 1 g. of 20 weight percent $WO_3$ supported upon zirconia gel which is partially prereduced before use by contact with hydrogen at 450° C. and atmospheric pressure for about 16 hours. The reactor contents are heated with agitation to 253° C. and ethylene is then introduced to an initial partial pressure of 660 p. s. i. Reaction is continued for 19 hours to yield 2.48 g. per g. of tungstia-zirconia catalyst of tough solid polyethylenes having a density (24/4° C.) of 0.957, Williams plasticity of 47.8 and melt viscosity of $4.2 \times 10^5$ poises. The reaction also yields 18 g. per g. of catalyst of solid grease-like polyethylenes, as well as some alkylated toluene.

In the above examples, by the term "specific viscosity" we mean—[relative viscosity $-1] \times 10^5$—and by "relative vicosity" we mean the ratio of the time of efflux of a solution of 0.125 g. polymer in 100 cc. of C. P. xylenes at 110° C. from a viscosimeter as compared with the time of efflux of 100 cc. of C. P. xylenes at 110° C. The melt viscosity is determined by the method of Dienes and Klemm, J. App. Phys. 17, 458–71 (1946).

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, gas barriers, binders, etc. to an even wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about 0.01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation, e. g., by treatment with sulfuryl chloride or mixtures of chlorine and sulfur dioxide, sulfonation, and other reactions to which hydrocarbons may be subjected.

This application is a continuation-in-part of our application for United States Letters Patent, Serial No. 324,611, filed on December 6, 1952, now abandoned.

Having thus described our invention, what we claim is:

1. In a process for the production of a normally solid hydrocarbon material, the steps which comprise contacting ethylene with a metal borohydride which reacts with water at the polymerization temperature to produce hydrogen and with an oxide of a metal of Group 6a of the Mendeleef Periodic Table under polymerization conditions including a polymerization reaction temperature between about 75° C. and about 325° C., and separating a normally solid hydrocarbon material thus produced.

2. The process of claim 1 wherein said oxide is partially pre-reduced before use.

3. In a process for the production of a normally solid hydrocarbon material, the steps which comprise contacting ethylene with a metal borohydride which reacts with water at the polymerization temperature to produce hydrogen and with an oxide of a metal of Group 6a of the Mendeleef Periodic Table in the presence of a liquid hydrocarbon reaction medium under poylmerization conditions including a polymerization reaction temperature between about 75° C. and about 325° C., and separating a normally solid hydrocarbon material thus produced.

4. The process of claim 3 wherein said liquid hydrocarbon reaction medium is a saturated hydrocarbon.

5. The process of claim 3 wherein said liquid hydrocarbon reaction medium is a monocyclic aromatic hydrocarbon.

6. The process of claim 3 wherein said borohydride is an alkali metal borohydride.

7. The process of claim 3 wherein said borohydride is lithium borohydride.

8. The process of claim 3 wherein said borohydride is sodium borohydride.

9. The process of claim 3 wherein said borohydride is magnesium borohydride.

10. The process of claim 3 wherein said borohydride is aluminum borohydride.

11. The process of claim 3 wherein said borohydride is lithium borohydride, said oxide is a minor proportion of molybdena supported upon a major proportion of a difficultly reducible metal oxide and said oxide is partially prereduced while present on said support.

12. The process of claim 3 wherein said borohydride is lithium borohydride, said oxide is a minor proportion of tungstia supported upon a major proportion of a difficultly reducible metal oxide and said oxide is partially prereduced while present on said support.

13. The process of claim 3 wherein said borohydride is sodium borohydride, said oxide is a minor proportion of molybdena supported upon a major proportion of a difficultly reducible metal oxide and said oxide is partially prereduced while present on said support.

14. The process of claim 3 wherein said borohydride is sodium borohydride, said oxide is a minor proportion of tungstia supported upon a major proportion of a difficultly reducible metal oxide and said oxide is partially prereduced while present on said support.

15. In a process for the production of a normally solid, resinous hydrocarbon material, the steps which comprise contacting ethylene in a concentration between about 2 weight percent and about 10 weight percent in a liquid hydrocarbon reaction medium with a metal borohydride which reacts with water at the polymerization temperature to produce hydrogen and with an oxide of a metal of Group 6a of the Mendeleef Periodic Table under polymerization conditions including a reaction temperature between about 75° C. and about 325° C. and a reaction pressure of at least about 200 p. s. i. g., and separating a normally solid, resinous hydrocarbon material thus produced.

16. The process of claim 15 wherein said oxide is partially pre-reduced before use.

17. The process of claim 15 wherein said borohydride is an alkali metal borohydride, said oxide is molybedna supported upon a difficultly reducible metal oxide and said liquid hydrocarbon reaction medium is a low-boiling monocyclic aromatic hydrocarbon.

18. The process of claim 15 wherein said borohydride is an alkali metal borohydride, said oxide is tungstia supported upon a difficultly reducible metal oxide and said liquid hydrocarbon reaction medium is a saturated hydrocarbon.

19. The process of claim 15 wherein said borohydride is lithium borohydride.

20. The process of claim 15 wherein said borohydride is sodium borohydride.

21. In a process for the production of a normally solid hydrocarbon material, the steps which comprise contacting a monoolefinic hydrocarbon containing 2 to 3 carbon atoms, inclusive, with a metal borohydride which reacts with water at the polymerization temperature to produce hydrogen and with an oxide of a metal of Group 6a of the Mendeleef Periodic Table under polymerization conditions including a polymerization reaction temperature between about 75° C. and about 325° C., and separating a normally solid hydrocarbon material thus produced.

No references cited.